Oct. 18, 1966  T. J. DALEY ETAL  3,279,691

MOLDED THERMOPLASTIC DRUMS FOR CYCLOMETER REGISTERS

Filed May 19, 1964

WITNESSES
Wm. B. Sellers.
James T. Young

INVENTORS
Thomas J. Daley and
Eugene G. Bezgela
BY
H. L. Towle
ATTORNEY

United States Patent Office 3,279,691
Patented Oct. 18, 1966

3,279,691
MOLDED THERMOPLASTIC DRUMS FOR
CYCLOMETER REGISTERS
Thomas J. Daley and Eugene G. Bezgela, Raleigh, N.C., assignors to Westinghouse Electric Corporation, Pittsburgh, Pa., a corporation of Pennsylvania
Filed May 19, 1964, Ser. No. 368,487
4 Claims. (Cl. 235—1)

The present invention relates to integrally molded resinous indicia-bearing drums. More particularly, the invention relates to molded resinous drums having particular utility in registers. The invention includes both the molded drums themselves and the method of their manufacture.

Previously, cyclometer drums have been manufactured from metal and, more recently, from resinous molding compositions. Metal drums were unsatisfactory in many respects concerning production problems and deficiencies in use where exposure to sunlight, moisture and wide temperature variations were encountered. The prior art molded resinous drums have also been deficient in resistance to ambient conditions in use and non-conformity of surface areas between the indicia and drum periphery.

It is a primary object of the present invention to provide a molded resinous cyclometer drum having outstandingly improved resistance to wear and deterioration in use.

A further object of the invention resides in the provision of a two-step molded drum having substantially no lack of surface conformance between the indicia and the drum periphery.

Another object of the invention resides in the provision of an improved two-step method of manufacture of said drums.

Other objects of the invention will become apparent from the following detailed description thereof. The description will be given with particular reference to the accompanying drawings in which.

Figure 1:
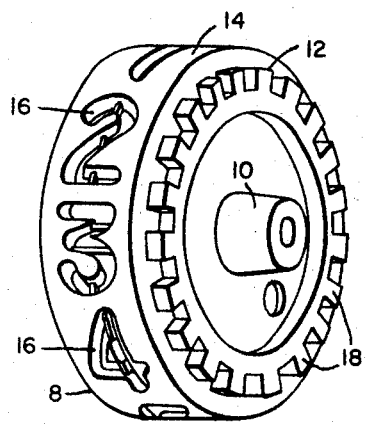
FIGURE 1 is a side view, in perspective, of the novel indicia-bearing drum of the invention illustrating the first-step product having recesses in the peripheral flange corresponding to the indicia, in this modification the numerals 1 through 0.

It will be seen that, in general, the novel indicia-bearing drum 8 comprises a centrally disposed hub 10, a flange 12 extending radially from the hub 10 and terminating in an annular peripheral flange 14. The flange 14 has recesses 16 extending therethrough corresponding to the configuration of the desired indicia. In the illustrative drawings, the indicia are the numerals 1 through 0. It is to be borne in mind, of course, that other indicia are within the contemplation of the invention such, for example, as symbols, letters, and the like. The drum 8 is produced, preferably, by a first injection molding operation. The drum 8 may be provided with teeth 18 for purposes of driving the drum in its end use. Other conventional elements such as races and the like may also be provided in the drum during the first molding operation. The molding operation will be described in detail hereinafter.

Figure 2:
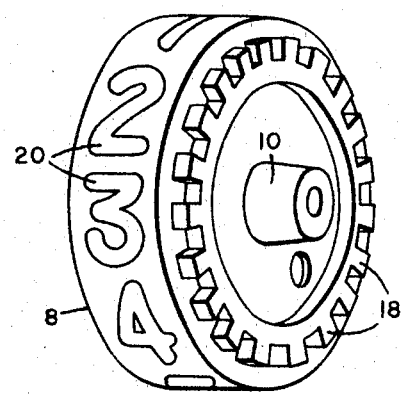
FIG. 2 is a similar side view illustrating, in perspective, the second-step product in which the indicia recesses have been filled with a resinous composition of a color contrasting to that of the first-step product.

The drum 8 is then transferred to a second mold and undergoes a second injection molding operation which fills the recesses 16 with a contrasting colored resinous composition to produce the indicia 20 illustrated in FIG. 2.

An outstanding critical feature of the invention resides in the discovery that one particular resinous material may be employed in both molding operations. The difference in the resinous compositions employed resides principally in the pigments employed in the two molding materials.

It was discovered that a chlorinated polyether resin, available commercially from Hercules Powder Company under the trade name "Penton," could be employed in both operations of our novel molding method. The molding operations are closely regulated so that no flash-over occurs during the second operation and there is no visible diffusion of one resin material into the other.

The resin "Penton" is a polymer of bischloromethyloxetane. Initially, pentaerythritol is treated with acetic acid under heat and is then hydrochlorinated at about 300° F. with hydrochloric acid to form trichloromonoacetate. This material is further reacted to produce bischloromethyloxetane which is the monomer from which the polymer is produced. Polymerization is carried out at high temperatures in the presence of a catalyst of the Lewis acid (electron acceptor) type. Unreacted monomer is stripped off and the polymer is then extruded in the form of pellets or powder. Coloring agents are mixed into the liquid polymer prior to its extrusion.

In producing the novel cyclometer register drums of the invention, powdered resin and filler are fed into the cylinder (piston) of the injection molding apparatus where it is heated to about 370° F. or higher. It is then injected into the mold cavity. Residence time in the mold cavity is about 5–40 seconds under 5,000–30,000 p.s.i. gage pressure although these values may vary dependent on the particular apparatus employed. The molded drum illustrated in FIG. 1 is then removed from the mold.

Figure 3:
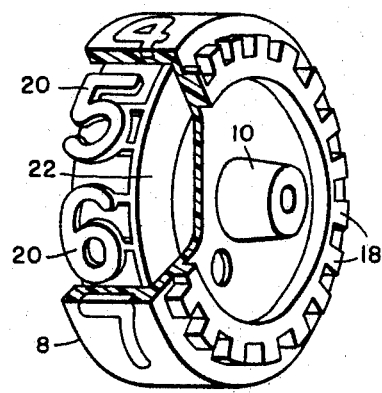
FIG. 3 is a side view in perspective, partly in section, of the novel drum of the invention.

The drum is then transferred to a second mold. Resin of contrasting color is fed to the heated apparatus cylinder where it reaches a temperature of about 370° F. or higher. It is then injected into the mold cavity. Residence time of the resin in the cavity is about 5–40 seconds under 5,000–30,000 p.s.i. pressure. Under these operating conditions, the fluid resin completely fills the indicia-conforming recesses of the molded drum obtained in the first molding operation. The resin is chilled as quickly as it contacts the mold walls. Accordingly, there is no flashing of the resin over the surface of the previously molded drum. The product, illustrated in FIG. 2 has a completely smooth peripheral surface which was unattainable according to the prior art methods. As will be noted, FIG. 3 shows that there is an inner collar 22 which interconnects the indicia and also serves to lock them securely in place. There is good adhesion between the collar and the inner surface of the peripheral flange 14 of the first-molded article.

From the foregoing description, it will be appreciated that the present invention provides a greatly improved cyclometer register drum. The novel product has an outstanding appearance and is completely impervious to ambient conditions in use.

We claim as our invention:

1. A molded cyclometer register drum consisting essentially of a circular resinous drum member having in integrally molded relationship a centrally disposed hub, a flange extending radially therefrom, and an annular peripheral flange, said peripheral flange having recesses extending therethrough corresponding to the numerals 1 through 0 inclusive, said recesses being completely filled with a chlorinated polyether resin.

2. An integrally molded resinous cyclometer register drum consisting essentially of a centrally disposed hub, a flange extending radially therefrom, said radial flange terminating in an annular peripheral flange having recesses extending therethrough corresponding to the numerals 1 through 0 inclusive, said drum being composed of a chlorinated polyether resin, said peripheral flange recesses being filled with a similar but different colored chlorinated polyether to afford contrasting indicia, the whole being an integral unit wherein there is no flashing of the indicia across the peripheral flange.

3. An integrally molded resinous indicia-bearing drum consisting essentially of a centrally disposed hub, a flange extending radially therefrom, said radial flange terminating in an annular peripheral flange having recesses extending therethrough corresponding to said indicia, said recesses being filled with said resin, the hub, radial flange, peripheral flange, and indicia consisting of a chlorinated polyether resin but with said indicia being different colored than said hub, radial flange, and peripheral flange, and the elements of the drum comprising an integral unit having no flashing of the indicia across the peripheral flange.

4. A method of producing a molded indicia-bearing drum comprising a first operation wherein a pigmented chlorinated polyether resin is molded under heat and pressure into a drum consisting essentially of a centrally disposed hub, a flange extending radially therefrom, said radial flange terminating in an annular peripheral flange, said peripheral flange having recesses extending therethrough corresponding to said indicia, and a second operation wherein a differently pigmented chlorinated polyether resin is molded under heat and pressure filling said indicia recesses without an appreciable flashing over the surface of said peripheral flange.

References Cited by the Examiner

UNITED STATES PATENTS

| | | | |
|---|---|---|---|
| 2,242,699 | 5/1941 | Flader | 235—1.3 |
| 2,288,187 | 6/1942 | Gits et al. | |
| 2,663,910 | 12/1953 | Danielson et al. | |
| 2,737,345 | 3/1956 | Harada | 235—1.3 X |
| 2,762,080 | 9/1956 | Heinze et al. | 18—59 |
| 2,969,175 | 1/1961 | Bliss | 235—1.3 |
| 2,996,241 | 8/1961 | Hoffman | 235—1.3 |
| 3,016,579 | 1/1962 | Schlitzkus | 18—59 |
| 3,086,245 | 4/1963 | Gits | 264—247 X |
| 3,138,323 | 6/1964 | Yolin | 235—1.3 |

RICHARD B. WILKINSON, *Primary Examiner.*

LEYLAND M. MARTIN, LEO SMILOW, *Examiners.*

C. G. COVELL, J. G. MURRAY, *Assistant Examiners.*